(12) United States Patent
Liu et al.

(10) Patent No.: US 11,983,900 B2
(45) Date of Patent: May 14, 2024

(54) IMAGE PROCESSING METHOD AND APPARATUS, STORAGE MEDIUM, AND ELECTRONIC DEVICE

(71) Applicant: TENCENT TECHNOLOGY (SHENZHEN) COMPANY LIMITED, Guangdong (CN)

(72) Inventors: Qi Liu, Shenzhen (CN); Guangzhou Zhai, Shenzhen (CN); Yuanxie Mai, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 292 days.

(21) Appl. No.: 17/588,536

(22) Filed: Jan. 31, 2022

(65) Prior Publication Data

US 2022/0164991 A1 May 26, 2022

Related U.S. Application Data

(63) Continuation of application No. PCT/CN2020/126344, filed on Nov. 4, 2020.

(30) Foreign Application Priority Data

Feb. 7, 2020 (CN) .......................... 202010082717.0

(51) Int. Cl.
*G06T 7/90* (2017.01)
*H04N 23/80* (2023.01)

(52) U.S. Cl.
CPC ............. *G06T 7/90* (2017.01); *H04N 23/80* (2023.01); *G06T 2207/10152* (2013.01)

(58) Field of Classification Search
CPC ............. G06T 7/90; G06T 2207/10152; G06T 2219/2012; G06T 15/503; G06T 15/506;
(Continued)

(56) References Cited

U.S. PATENT DOCUMENTS 5,610,735 A * 3/1997 Ohmae ................ H04N 5/7441
349/86
6,016,150 A 1/2000 Lengyel et al.
(Continued)

FOREIGN PATENT DOCUMENTS

CN 104134230 A 11/2014
CN 104392479 A 3/2015
(Continued)

OTHER PUBLICATIONS

Extended European Search Report dated Nov. 2, 2022 in European Application No. 20917554.6.
(Continued)

*Primary Examiner* — Ali Bayat
(74) *Attorney, Agent, or Firm* — Sughrue Mion, PLLC

(57) ABSTRACT

A method includes obtaining a first image to be rendered, obtaining a target mask image corresponding to the first image where a g component of the target mask image stores first light change data and a b component of the target mask image stores second light change data, the first light change data being change data of light on a left side of the first image used when the first image is rendered and the second light change data being change data of light on a right side of the first image used when the first image is rendered, and rendering the first image by using the target mask image to obtain a second image.

20 Claims, 5 Drawing Sheets

(58) Field of Classification Search
CPC ....... G06T 15/80; G06T 19/20; G06T 15/005; H04N 23/80
USPC ......................................................... 382/325
See application file for complete search history.

(56) References Cited

U.S. PATENT DOCUMENTS

| | | | |
|---|---|---|---|
| 7,583,264 B2 | 9/2009 | Nakagawa et al. | |
| 8,773,433 B1* | 7/2014 | Smyrl | G06T 15/506 345/426 |
| 2006/0215908 A1* | 9/2006 | Kamon | H04N 1/6088 382/167 |
| 2013/0265306 A1 | 10/2013 | Landweber | |
| 2016/0360167 A1* | 12/2016 | Mitchell | H04N 9/3182 |
| 2018/0139370 A1* | 5/2018 | Ichiki | G06T 7/90 |
| 2022/0148257 A1* | 5/2022 | Boubekeur | G06T 15/506 |

FOREIGN PATENT DOCUMENTS

| | | |
|---|---|---|
| CN | 108492339 A | 9/2018 |
| CN | 108520551 A | 9/2018 |
| CN | 109887066 A | 6/2019 |
| CN | 111260768 A | 6/2020 |
| EP | 1 258 837 A1 | 11/2002 |
| JP | 2001319244 A | 11/2001 |
| JP | 2017129950 A | 7/2017 |

OTHER PUBLICATIONS

International Search Report dated Feb. 7, 2021 in International Application No. PCT/CN2020/126344.
Written Opinion of the International Searching Authority dated Feb. 7, 2021 in International Application No. PCT/CN2020/126344.

* cited by examiner

IMAGE PROCESSING METHOD AND APPARATUS, STORAGE MEDIUM, AND ELECTRONIC DEVICE

CROSS-REFERENCE TO RELATED APPLICATIONS

This application is a continuation application of International Application No. PCT/CN2020/126344 filed on Nov. 4, 2020 which claims priority to Chinese Patent Application No. 202010082717.0 filed with the China National Intellectual Property Administration on Feb. 7, 2020, the disclosures of which are incorporated by reference in their entireties.

FIELD

The disclosure relates to the field of image processing, and in particular, to an image processing method and apparatus, a storage medium, and an electronic device.

BACKGROUND

In the related art, when light projected on an image changes, in order to better present a light effect on an object in the image (for example, a person), a usual method is to use a 3D model to represent the object in the image and realize light projection by arranging a real-time light source or a baking scene in a scene where the image is located. However, for this method, the real-time light source will consume performance and increase power consumption on a mobile terminal device, which will further cause stuttering in operation of a mobile terminal device with low-performance.

SUMMARY

Embodiments of the disclosure provide an image processing method and apparatus, a storage medium, and an electronic device, which can avoid stuttering of a mobile terminal device caused by an increase in power consumption of the mobile terminal device due to image rendering.

The embodiments of the disclosure may provide an image processing method, including:
  obtaining a first image to be rendered;
  obtaining a target mask image corresponding to the first image,
  a g component of the target mask image storing first light change data, a b component of the target mask image storing second light change data, the first light change data being change data of light on a left side of the first image used when the first image is rendered, and the second light change data being change data of light on a right side of the first image used when the first image is rendered; and
  rendering the first image by using the target mask image, to obtain a second image.

The embodiments of the disclosure may provide an image processing apparatus, including:
  a first obtaining unit, configured to obtain a first image to be rendered;
  a second obtaining unit, configured to obtain a target mask image corresponding to the first image,
  a g component of the target mask image storing first light change data, a b component of the target mask image storing second light change data, the first light change data being change data of light on a left side of the first image used when the first image is rendered, and the second light change data being change data of light on a right side of the first image used when the first image is rendered; and
  a rendering unit, configured to render the first image by using the target mask image, to obtain the second image.

The embodiments of the disclosure may provide a computer-readable storage medium, the computer-readable storage medium storing a computer program, the computer program, when run, performing the foregoing image processing method.

The embodiments of the disclosure may provide an electronic device, including a memory, a processor, and a computer program stored in the memory and capable of being run on the processor, and the processor being configured to, when running the computer program, perform the foregoing image processing method.

The application of the image processing method and apparatus, the storage medium, and the electronic device according to the embodiments of the disclosure has at least the following beneficial technical effects:

A purpose of rendering an image by using light change data stored in a target mask image of the image is realized, thereby avoiding using a 3D model. Light projection is implemented by arranging a real-time light source or a baking scene in a scene, thereby further avoiding stuttering of a mobile terminal device caused by an increase in power consumption of the mobile terminal device due to image rendering.

BRIEF DESCRIPTION OF THE DRAWINGS

To describe the technical solutions of example embodiments of the disclosure more clearly, the following briefly describes the accompanying drawings required for describing the example embodiments of the disclosure. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone In the accompanying drawings.

DETAILED DESCRIPTION

In order to make persons skilled in the art better understand the solutions of the disclosure, the following clearly and completely describes the technical solutions in the embodiments of the disclosure with reference to the accompanying drawings in the embodiments of the disclosure. The described embodiments are only some of the embodiments of the disclosure rather than all of the embodiments. All other embodiments obtained by a person of ordinary skill in the art based on the embodiments of the disclosure without creative efforts shall fall within the protection scope of the disclosure.

In this specification, claims, and accompanying drawings of the disclosure, the terms "first", "second", and so on are intended to distinguish similar objects but do not necessarily indicate a specific order or sequence. It is to be understood that such used data is interchangeable where appropriate so that the embodiments of the disclosure described here can be implemented in an order other than those illustrated or described here. Moreover, the terms "include", "contain" and any other variants mean to cover the non-exclusive inclusion, for example, a process, method, system, product, or device that includes a list of operations or units is not necessarily limited to those expressly listed operations or units, but may include other operations or units not expressly listed or inherent to such a process, method, system, product, or device.

Figure 1:
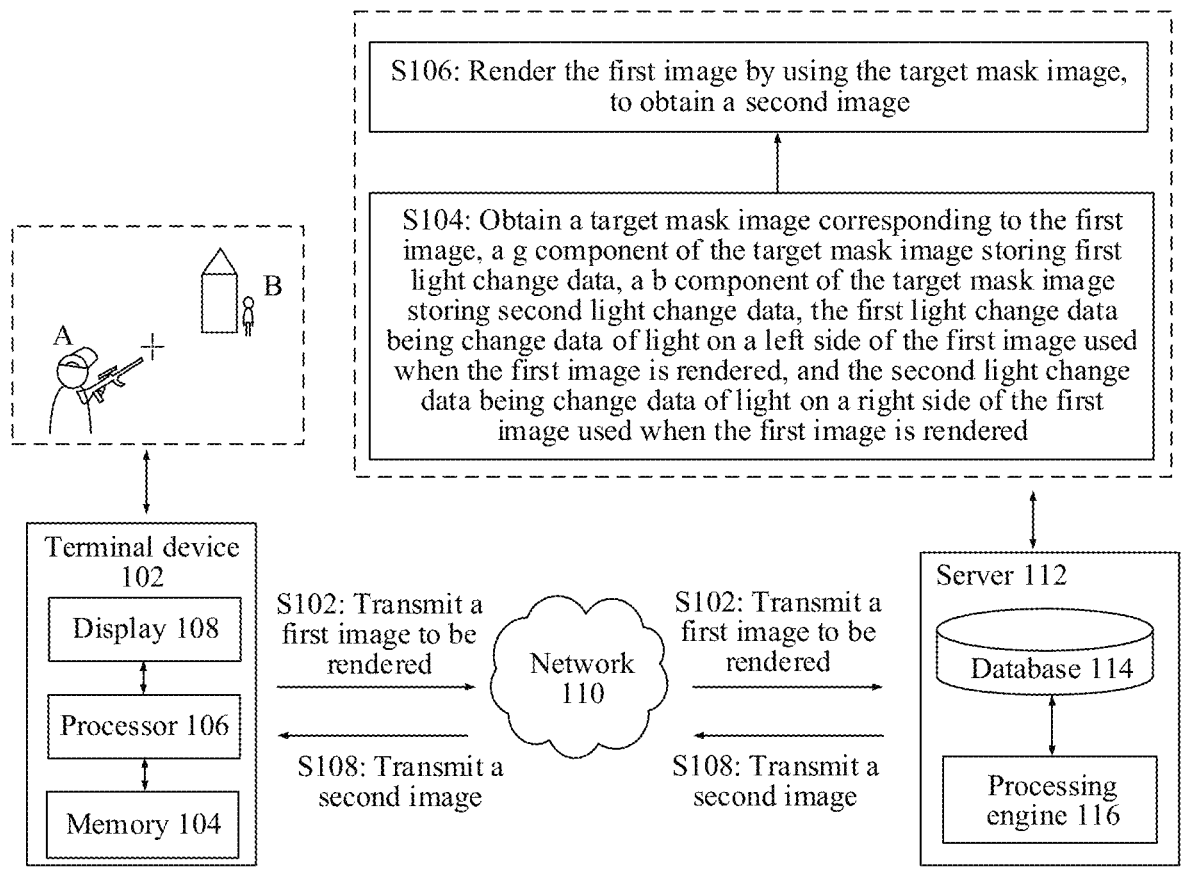
FIG. 1 is a schematic diagram of an application environment of an image processing method according to an embodiment of the disclosure.

The embodiments of the disclosure provide an image processing method, which may, but is not limited to, be applied to an image processing system in a hardware environment as shown in FIG. 1. The image processing system may include, but is not limited to, a terminal device 102, a network 110, and a server 112. The terminal device 102 is configured to display a first image to be rendered and a second image obtained by rendering the first image.

The terminal device 102 may include, but is not limited to: a display 108, a processor 106, and a memory 104. The display 108 is configured to obtain a human-computer interaction instruction through a human-computer interaction interface, and is further configured to present the first image to be rendered. The processor 106 is configured to respond to the human-computer interaction instruction and use a target mask image corresponding to the first image to render the first image. The memory 104 is configured to store the first image to be rendered and attribute information of the target mask image corresponding to the first image.

The server 112 may include, but is not limited to: a database 114 and a processing engine 116. The processing engine 116 is configured to call the target mask image corresponding to the first image stored in the database 114. A second image is obtained by using the target mask image to render the first image. Therefore, a purpose of rendering an image by using light change data stored in the target mask image of the image is realized, thereby avoiding using a 3D model. Light projection is implemented by arranging a real-time light source or a baking scene in a scene, thereby further avoiding stuttering of a mobile terminal device caused by an increase in power consumption of the mobile terminal device due to image rendering.

The specific process is as follows. The display 108 in the terminal device 102 is configured to display the first image to be rendered (for example, a game screen in a shooting game as shown in FIG. 1, in which a target virtual character is sniping a target object in the distance). Operations S102-S108 are included. In S102, the terminal device 102 obtains the first image to be rendered, and transmits the first image to the server 112 through the network 110. In S104, the server 112 obtains the target mask image corresponding to the first image, where a g component of the target mask image stores first light change data, and a b component of the target mask image stores second light change data. The first light change data is change data of light on a left side of the first image used when the first image is rendered. The second light change data is change data of light on a right side of the first image used when the first image is rendered. S106: Render the first image by using the target mask image, to obtain the second image. In S108, the server 112 returns the second image obtained above to the terminal device 102 through the network 110.

In some embodiments, the terminal device 102 obtains the first image to be rendered; obtains the target mask image corresponding to the first image, the g component of the target mask image storing the first light change data, the b component of the target mask image storing the second light change data, the first light change data being change data of light on the left side of the first image used when the first image is rendered, and the second light change data being change data of light on the right side of the first image used when the first image is rendered; renders the first image by using the target mask image, to obtain the second image. Therefore, a purpose of rendering an image by using the light change data stored in the target mask image of the image is realized, thereby avoiding using the 3D model. Light projection is implemented by arranging a real-time light source or a baking scene in a scene, thereby further avoiding stuttering of a mobile terminal device caused by an increase in power consumption of the mobile terminal device due to image rendering.

In some embodiments, the foregoing image processing method may, but is not limited to, be applied to the server 112, and is further used for assisting an application client to render the first image by using a mask image corresponding to the first image. The application client may, but is not limited to, be run on the terminal device 102. The terminal device 102 may be, but is not limited to, a terminal device that can support the application client, such as a mobile phone, a tablet computer, a notebook computer, a personal computer (PC), or the like. The server 112 and the terminal device 102 may, but are not limited to, perform data exchange with each other through a network. The network may include, but is not limited to, a wireless network or a wired network. The wireless network includes: Bluetooth, Wi-Fi, and other networks which can implement wireless communication. The wired network may include, but is not limited to: a wide area network, a metropolitan area network, and a local area network. The server 112 may include, but is not limited to, any hardware device that can perform calculation. The server 112 may be an independent physical server, or may be a server cluster or a distributed system including a plurality of physical servers, or may be a cloud server that provides a basic cloud computing service such as a cloud service, a cloud database, cloud computing, a cloud function, cloud storage, a network service, cloud communication, a middleware service, a domain name service, a security service, big data, and an artificial intelligence platform.

Figure 2:
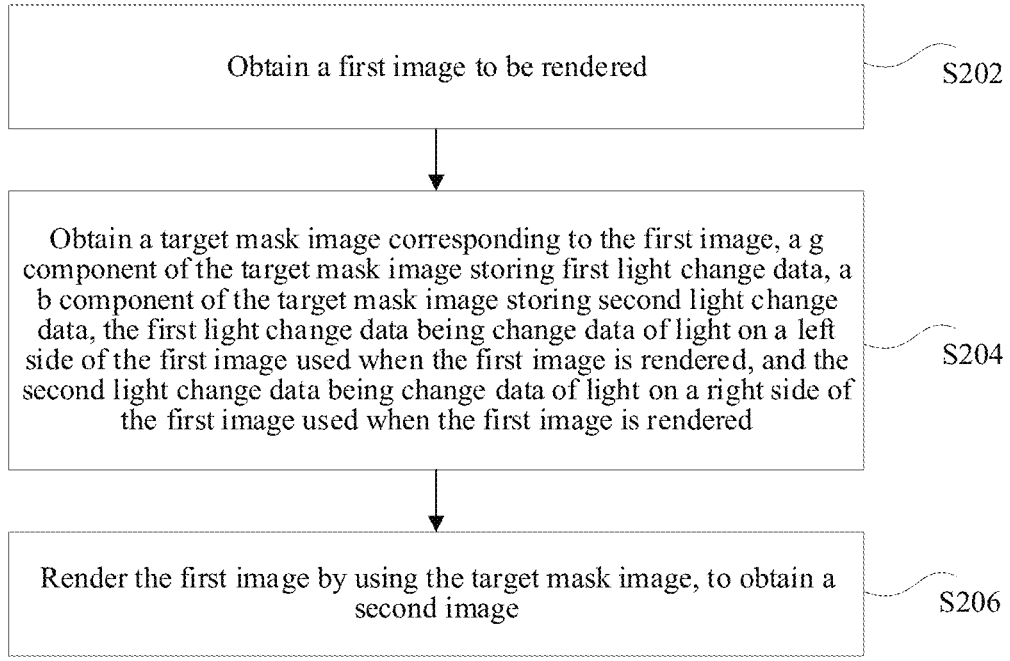
FIG. 2 is a flowchart of an image processing method according to an embodiment of the disclosure.

In some embodiments, as shown in FIG. 2, the foregoing image processing method includes:

S202: Obtain a first image to be rendered.

S204: Obtain a target mask image corresponding to the first image, a g component of the target mask image storing first light change data, a b component of the target mask image storing second light change data, the first light change data being change data of light on a left side of the first image used when the first image is rendered, and the second light change data being change data of light on a right side of the first image used when the first image is rendered.

S206: Render the first image by using the target mask image, to obtain a second image.

In some embodiments, the first image to be rendered may include, but is not limited to: an image including a character object, and an image including a static object.

In an actual application, a 2D real-life image is used in character choosing, a screen light position is fixed, and an artist outputs a light mask image (that is, the target mask image) according to a light direction. The mask image is an opaque image, where the r, g, and b components of r, g, and b data correspond to different data. Due to a need to separately control color changes on both sides of the character, the g component of the mask image stores change data of light on the left side, and the b component of the mask image stores change data of light on the right side.

Figure 3:
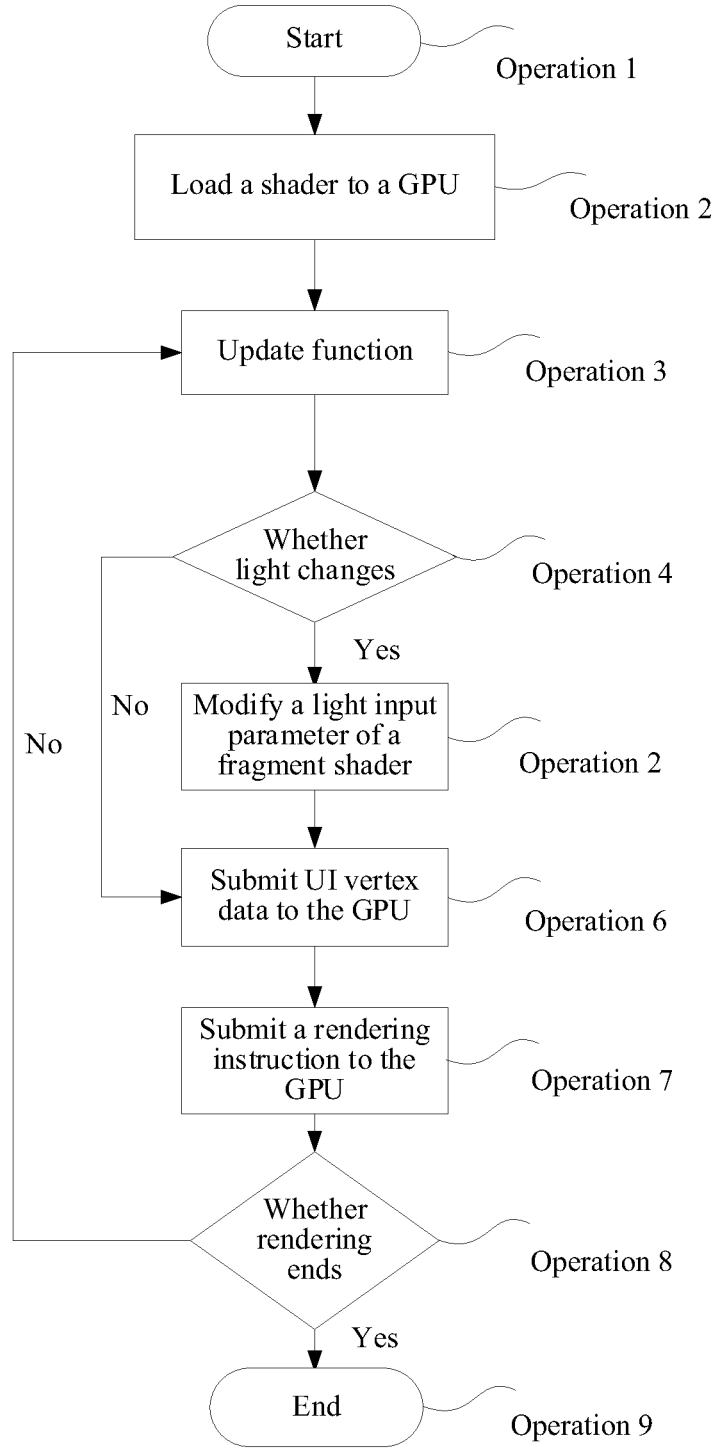
FIG. 3 is a flowchart of using a custom shader to render a first image according to an embodiment of the disclosure.

The first image is rendered by a custom shader, and FIG. 3 is a program workflow diagram.

Operation 1: Start.

That is, the first image is started to be rendered.

Operation 2: Load a shader to a graphics processing unit (GPU).

Operation 3: Call an Update function.

Operation 4: Determine whether a light parameter changes, and if yes, perform operation 5; otherwise, perform operation 6.

Operation 5: Modify a light input parameter of a fragment shader.

Operation 6: Submit UI vertex data (including mask texture and first image texture) to the GPU, and set a rendering state (shader, start mixing).

Operation 7: Submit a rendering instruction to the GPU.

Operation 8: Determine whether rendering ends, and if yes, perform operation 9; otherwise, perform operation 3.

Operation 9: End.

After the first image is started to be rendered, a CPU will call the Update function once for each frame. In the Update function, whether the light parameter of a screen changes is determined, and if yes, left and right light color input parameters of the shader are modified. All rendering data in each frame will be submitted to the GPU by the custom shader.

Figure 4:
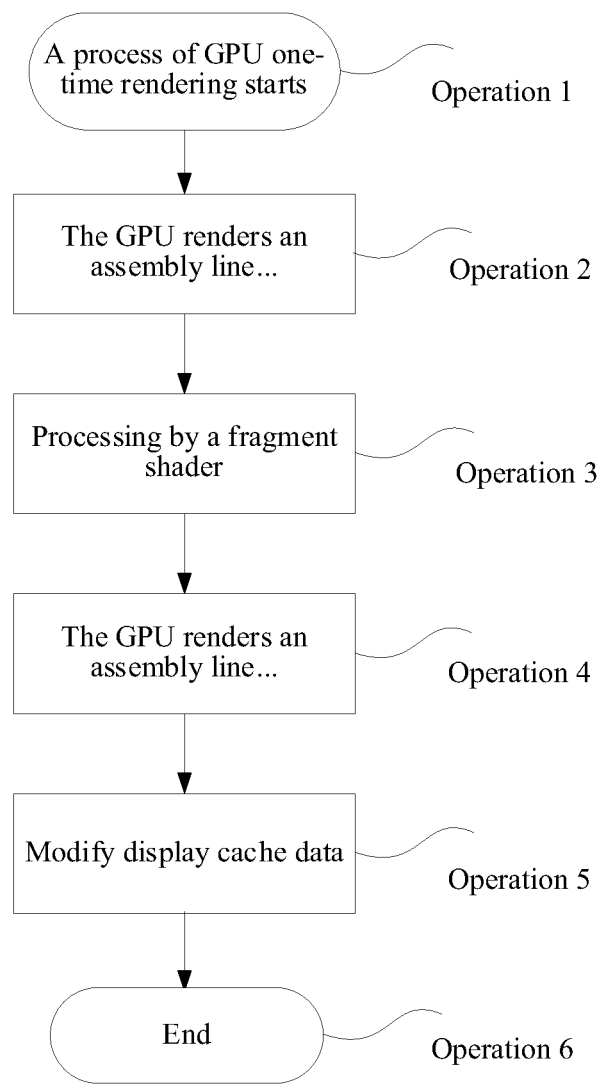
FIG. 4 is an engineering flowchart of GPU one-time rendering according to an embodiment of the disclosure.

The GPU is responsible for rendering data submitted by the CPU. FIG. 4 is an engineering flowchart of GPU one-time rendering.

Operation 1: A process of the GPU one-time rendering starts.

Operation 2: The GPU renders an assembly line.

Operation 3: Fragment shader processing: use the first image and the mask image corresponding to the first image to mix light colors, and return a fragment color value.

Operation 4: The GPU renders the assembly line.

Operation 5: Modify display cache data.

Operation 6: End.

When rendering a player image, the GPU will call custom shader code. In a fragment function of the shader, the player image and the mask image are sampled. Left and right light colors have been transmitted to a shader variable as parameters. The rgba data values of a fragment can be obtained by mixing and superimposing the light colors and image sample data.

With the application of the foregoing embodiments of the disclosure, a first image to be rendered is obtained. A target mask image corresponding to the first image is obtained. A g component of the target mask image stores first light change data, and a b component of the target mask image stores second light change data. The first light change data is change data of light on a left side of the first image used when the first image is rendered. The second light change data is change data of light on a right side of the first image used when the first image is rendered. The first image is rendered by using the target mask image to obtain a second image. Therefore, a purpose of rendering an image by the light change data stored in the target mask image of the image is realized, thereby avoiding using a 3D model. Light projection is implemented by arranging a real-time light source or a baking scene in a scene, thereby further avoiding stuttering of a mobile terminal device caused by an increase in power consumption of the mobile terminal device due to image rendering.

Figure 5:
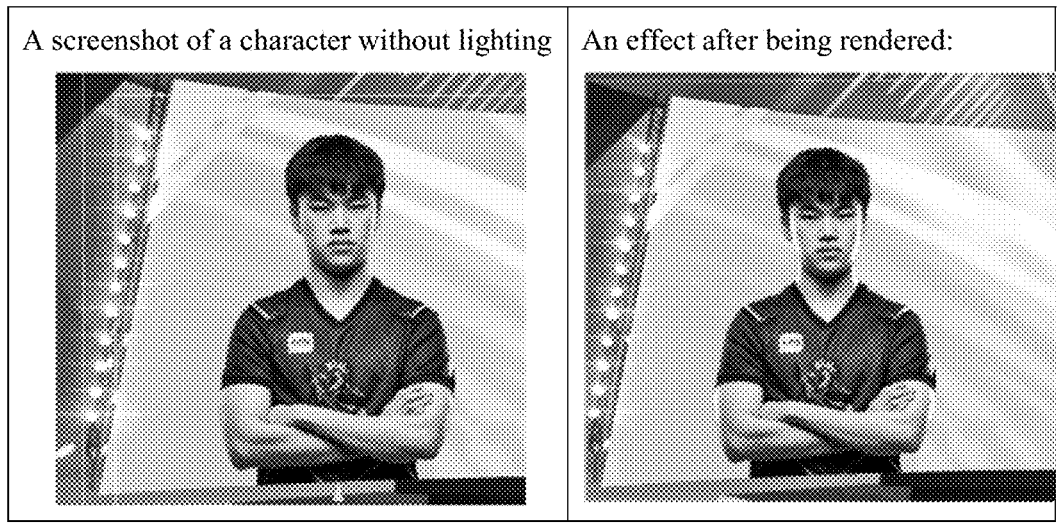
FIG. 5 is a comparison diagram of rendering results of a first image according to an embodiment of the disclosure.

In an actual application, a high-definition effect can be realized by using a 2D image. Light and shadow of clothes folds of a character can be realized quite delicately, and performance of a game is ensured at the same time. Alpha data and light data are merged into a mask image, which will not increase the number of images in the game. An effect diagram shown in FIG. 5 can be realized by using the technical solutions provided by the disclosure.

As a screen light changes, light projection of different colors will appear on a left side and a right side of a character body according to a change in ambient light. An image on a left side is a screenshot of an unrealized effect, and an image on a right side is a screenshot of an effect realized by the technical solutions of the disclosure. Both sides of the face, shoulders, and arms of the character in an image on a right side show a detailed light projection effect.

In some embodiments, the rendering the first image by using the target mask image, to obtain a second image includes:

In a case that an r component of the target mask image stores an alpha value of a third image, rendering the first image by using the r component, the g component, and the b component of the target mask image, to obtain the second image, the first image being an image obtained by compressing the third image, the third image being an image with transparency, and the alpha value being used for indicating the transparency of the third image.

Figure 6:
FIG. 6 is a first image and a mask image corresponding to the first image according to an embodiment of the disclosure.
Figure 6:

In order to support an Android mobile phone with low performance and reduce a game memory, ericsson texture compression (ETC) is used as a compression algorithm of the image in the disclosure. The ETC compression is not suitable for an image with transparency. In the related art, the alpha value of the image needs to be saved in another image. In the disclosure, in order to reduce a number of images and save disk space, the alpha value of an original character image is saved in the r component of the mask image. FIG. 6 is the first image and the mask image corresponding to the first image. That is, a left image is the first image, and a right image is the mask image corresponding to the first image. The mask image generally presented in color 1 is the r component representing the alpha value. Left data is r and g components, presented in color 2. Right data is r and b components, presented in color 3.

In some embodiments, before the first image is rendered by using the target mask image, in a case that the first image is the image obtained by compressing the third image, and the third image is the image with the transparency, the alpha value of the third image is stored in the r component of the target mask image.

In some embodiments, the rendering the first image by using the target mask image, to obtain a second image includes:

collecting original data in the first image;

obtaining first light variation data stored in the g component of the target mask image, and second light variation data stored in the b component of the target mask image; and superimposing the first light variation data and the second light variation data with the original data in the first image, to obtain the second image.

In some embodiments, after the original data to be rendered in the first image is obtained, the method further includes:

obtaining first light data after changing stored in the g component of the target mask image, and second light data after changing stored in the b component of the target mask image; and overwriting the data to be rendered in the first image with the first light data after changing and the second light data after changing, to obtain the second image.

In some embodiments, the rendering the first image by using the target mask image, to obtain a second image includes:

superimposing original data in the first image with the g component and the b component in the target mask image corresponding to the first image by calling a target function, to obtain the second image.

In some embodiments, before the obtaining a first image to be rendered, in a case that a change in data corresponding to the g component and the b component of the target mask image corresponding to a third image may be detected by using a judgment function, the third image is determined as the first image to be rendered.

For brief description, the method embodiments mentioned above are described as a series of actions. However, persons skilled in the art should appreciate that the disclosure is not limited to the described order of the actions, because according to the disclosure, some operations may be performed in other orders or simultaneously. In addition, a person skilled in the art is also to learn that the embodiments described in this specification are all exemplary embodiments, and the involved actions and modules are not necessarily required to the disclosure.

Figure 7:
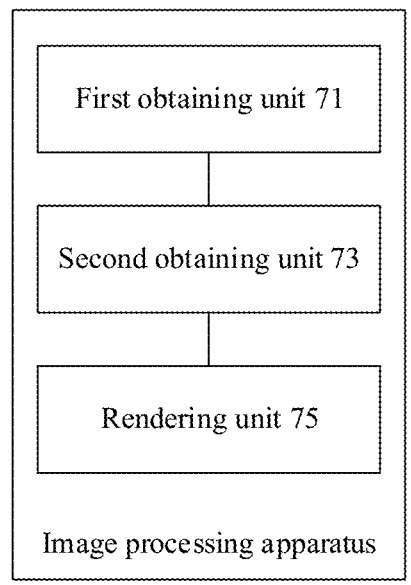
FIG. 7 is a schematic structural diagram of an image processing apparatus according to an embodiment of the disclosure.

The embodiments of the disclosure further provide an image processing apparatus to implement the foregoing image processing method. As shown in FIG. 7, the apparatus includes: a first obtaining code 71, a second obtaining code 73, and a rendering code 75.

The first obtaining code 71 is configured to obtain a first image to be rendered.

The second obtaining code 73 is configured to obtain a target mask image corresponding to the first image, where a g component of the target mask image stores first light change data, and a b component of the target mask image stores second light change data. The first light change data is change data of light on a left side of the first image used when the first image is rendered. The second light change data is change data of light on a right side of the first image used when the first image is rendered.

The rendering code 75 is configured to render the first image by using the target mask image, to obtain the second image.

In some embodiments, the rendering code 75 includes:

a second rendering code, configured to render, in a case that an r component of the target mask image stores an alpha value of a third image, the first image by using the r component, the g component, and the b component of the target mask image, to obtain the second image, the first image being an image obtained by compressing the third image, the third image being an image with transparency, and the alpha value being used for indicating the transparency of the third image.

With the application of the foregoing embodiments of the disclosure, the first obtaining code 71 obtains the first image to be rendered. The second obtaining code 73 obtains the target mask image corresponding to the first image, where the g component of the target mask image stores the first light change data, and the b component of the target mask image stores the second light change data. The first light change data is change data of light on the left side of the first image used when the first image is rendered. The second light change data is change data of light on the right side of the first image used when the first image is rendered. The rendering code 75 uses the target mask image to render the first image, to obtain the second image. A purpose of rendering an image by using the light change data stored in the target mask image of the image is realized, thereby avoiding using a 3D model. Light projection is implemented by arranging a real-time light source or a baking scene in a scene, thereby further avoiding stuttering of a mobile terminal device caused by an increase in power consumption of the mobile terminal device due to image rendering.

In some embodiments, the apparatus further includes:

a storing code, configured to store the alpha value of the third image in the r component of the target mask image, before the first image is rendered by using the target mask image, in a case that the first image is the image obtained by compressing the third image, and the third image is the image with the transparency.

In some embodiments, the rendering unit 75 includes:

a collecting code, configured to collect original data in the first image;

a data obtaining code, configured to obtain first light variation data stored in the g component of the target mask image, and second light variation data stored in the b component of the target mask image; and a first superimposing code, configured to superimpose the first light variation data and the second light variation data with the original data in the first image, to obtain the second image.

In some embodiments, the apparatus further includes:

a third obtaining code, configured to obtain first light data after changing stored in the g component of the target mask image, and second light data after changing stored in the b component of the target mask image, after the original data to be rendered in the first image is obtained; and a processing code, configured to overwrite the data to be rendered in the first image with the first light data after changing and the second light data after changing, to obtain the second image.

In some embodiments, the apparatus yet still further includes:

a second superimposing code, configured to superimpose original data of the first image with the g component and the b component in the target mask image corresponding to the first image by calling a target function, to obtain the second image.

Figure 8:
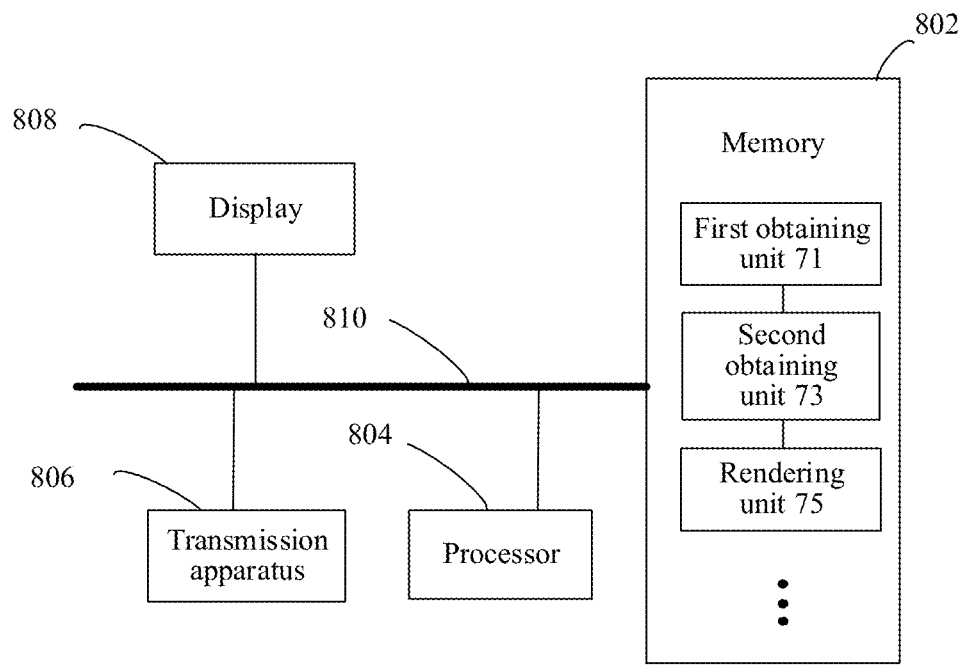
FIG. 8 is a schematic structural diagram of an electronic device to perform an image processing method according to an embodiment of the disclosure.

The embodiments of the disclosure further provide an electronic device for implementing the foregoing image processing method. As shown in FIG. 8, the electronic device includes a memory 802 and a processor 804, the memory 802 storing a computer program, and the processor 804 being configured to perform operations in any one of the foregoing method embodiments by running the computer program.

In some embodiments, the electronic device may be located in at least one of a plurality of network devices in a computer network.

In some embodiments, the processor may be configured to perform the following operations by running the computer program:

S1: Obtain a first image to be rendered.

S2: Obtain a target mask image corresponding to the first image, a g component of the target mask image storing first light change data, a b component of the target mask image storing second light change data, the first light change data being change data of light on a left side of the first image used when the first image is rendered, and the second light change data being change data of light on a right side of the first image used when the first image is rendered.

S3: Render the first image by using the target mask image to obtain a second image.

In some embodiments, a person of ordinary skill in the art may understand that, the structure shown in FIG. 8 is only illustrative. The electronic device may be a terminal device such as a smart phone (for example, an Android phone, or an iOS phone), a tablet computer, a palmtop computer, a mobile Internet device (MID), or a PAD, or may be servers of a plurality of types. FIG. 8 does not limit the structure of the electronic device. For example, the electronic device may further include more or fewer components (such as a network interface) than those shown in FIG. 8, or have a configuration different from that shown in FIG. 8.

The memory 802 may be configured to store a software program and a module, for example, a program instruction/module corresponding to the image processing method and apparatus in the embodiments of the disclosure, and the processor 804 performs various functional applications and data processing, that is, implementing the image processing method, by running the software program and the module stored in the memory 802. The memory 802 may include a high-speed random memory, and may also include a nonvolatile memory, for example, one or more magnetic storage apparatuses, a flash memory, or another nonvolatile solid-state memory. In some embodiments, the memory 802 may further include memories remotely disposed relative to the processor 804, and the remote memories may be connected to a terminal through a network. Examples of the network include, but are not limited to, the Internet, an intranet, a local area network, a mobile communication network, and a combination thereof. The memory 802 may, but is not limited to, be configured to store information such as the first image to be rendered, the target mask image corresponding to the first image, and the second image. As an example, as shown in FIG. 8, the memory 802 may include, but is not limited to, a first obtaining code 71, a second obtaining code 73, and a rendering code 75 in the image processing apparatus. In addition, the memory 802 may further include, but is not limited to, other code, modules and units in the image processing apparatus, and details are not described herein again in this example.

In some embodiments, the above transmission apparatus 806 is configured to receive or transmit data through a network. Examples of the network may include a wired network and a wireless network. In an example, the transmission apparatus 806 includes a network interface controller (NIC). The NIC may be connected to another network device and a router by using a network cable, so as to communicate with the Internet or a local area network. In an example, the transmission apparatus 806 is a radio frequency (RF) module that is configured to communicate with the Internet in a wireless manner.

In addition, the electronic device further includes: a display 808, configured to display the first image to be rendered, and the second image; and a connection bus 810, configured to connect module components in the electronic device.

The embodiments of the disclosure provide a computer-readable storage medium. The computer-readable storage medium stores a computer program, where the computer program is configured to, when run, implement the image processing method provided in the embodiments of the disclosure.

In some embodiments, the computer-readable storage medium may be configured to store a computer program for performing the following operations:

S1: Obtain a first image to be rendered.

S2: Obtain a target mask image corresponding to the first image, a g component of the target mask image storing first light change data, a b component of the target mask image storing second light change data, the first light change data being change data of light on a left side of the first image used when the first image is rendered, and the second light change data being change data of light on a right side of the first image used when the first image is rendered.

S3: Render the first image by using the target mask image to obtain a second image.

In some embodiments, a person of ordinary skill in the art may understand that all or some of the operations of the methods in the foregoing embodiments may be implemented by a program instructing relevant hardware of the terminal device. The program may be stored in a computer-readable storage medium, and the storage medium may include a flash disk, a read-only memory (ROM), a random access memory (RAM), a magnetic disk, an optical disc, or the like.

The sequence numbers of the embodiments of the disclosure are merely for description purpose but do not imply the preference among the embodiments.

When the integrated code (or modules/units) in the embodiments is implemented in a form of a software functional unit and sold or used as an independent product, the integrated unit may be stored in the computer-readable storage medium. Based on such an understanding, the technical solutions of the disclosure essentially, or a part contributing to the related art, or all or a part of the technical solution may be implemented in a form of a software product. The computer software product is stored in a storage medium and includes several instructions for instructing one or more computer devices (which may be a PC, a server, a network device or the like) to perform all or some of operations of the methods in the embodiments of the disclosure.

In the embodiments of the disclosure, the descriptions of the embodiments have respective focuses. For a part that is not described in detail in an embodiment, refer to related descriptions in other embodiments.

In the several embodiments provided in the disclosure, the disclosed client may be implemented in another manner. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, code, units, or modules, and may be electrical or of other forms.

For ease of description, the foregoing components are respectively described as various code (or modules/units) divided according to functions. The code (or modules/units) described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of the disclosure may be integrated into one processing unit, or each of the units may be physically separated, or two or more units may be integrated into one unit. The integrated unit may be implemented in the form of hardware, or may be implemented in a form of a software functional unit.

The descriptions are merely exemplary implementations of the disclosure. A person of ordinary skill in the art may further make several improvements and modifications without departing from the principle of the disclosure, and the improvements and modifications fall within the protection scope of the disclosure.

What is claimed is:

1. A method, performed by an electronic device, the method comprising:
    obtaining a first image to control color changes of the first image;
    obtaining a target mask image corresponding to the first image where a green color component of the target mask image stores first light change data and a blue color component of the target mask image stores second light change data, the first light change data being change data of light on a left side of the first image used when the first image is rendered and the second light change data being change data of light on a right side of the first image used when the first image is rendered; and
    rendering the first image by using the target mask image to obtain a second image.

2. The method according to claim 1, wherein the rendering the first image by using the target mask image to obtain a second image comprises:
    in a case that a red color component of the target mask image stores an alpha value of a third image, rendering the first image by using the red color component, the green color component, and the blue color component of the target mask image to obtain the second image, the first image being an image obtained by compressing the third image, the third image being an image with transparency, and the alpha value being used for indicating the transparency of the third image.

3. The method according to claim 2, wherein before the rendering the first image by using the target mask image, the method further comprises:
    storing the alpha value of the third image in the red color component of the target mask image, in a case that the first image is the image obtained by compressing the third image, and the third image is the image with the transparency.

4. The method according to claim 1, wherein the rendering the first image by using the target mask image to obtain a second image comprises:
    collecting original data in the first image;
    obtaining first light variation data stored in the green color component of the target mask image, and second light variation data stored in the blue color component of the target mask image; and
    superimposing the first light variation data and the second light variation data with the original data in the first image, to obtain the second image.

5. The method according to claim 4, wherein after the original data to be rendered in the first image is obtained, the method further comprises:
    obtaining first light data after changing stored in the green color component of the target mask image, and second light data after changing stored in the blue color component of the target mask image; and
    overwriting the data to be rendered in the first image with the first light data after changing and the second light data after changing, to obtain the second image.

6. The method according to claim 1, wherein the rendering the first image by using the target mask image to obtain a second image comprises:
    superimposing original data in the first image with the green color component and the blue color component of the target mask image corresponding to the first image by calling a target function, to obtain the second image.

7. The method according to claim 1, wherein before the obtaining a first image to be rendered, the method further comprises:
    in a case that a change in data corresponding to the green color component and the blue color component of the target mask image corresponding to the third image is detected by using a judgment function, determining the third image as the first image to be rendered.

8. An apparatus comprising:
    at least one memory configured to store program code; and
    at least one processor configured to read the program code and operate as instructed by the program code, the program code comprising:
    first obtaining code configured to cause the at least one processor to obtain a first image to control color changes of the first image;
    second obtaining code configured to cause the at least one processor to obtain a target mask image corresponding to the first image, where a green color component of the target mask image stores first light change data and a blue color component of the target mask image stores second light change data, the first light change data being change data of light on a left side of the first image used when the first image is rendered and the second light change data being change data of light on a right side of the first image used when the first image is rendered; and
    rendering code configured to cause the at least one processor to render the first image by using the target mask image, to obtain a second image.

9. The apparatus according to claim 8, wherein the rendering code comprises:
    second rendering code configured to cause the at least processor to render, in a case that a red color component of the target mask image stores an alpha value of a third image, the first image by using the red color component, the green color component, and the blue color component of the target mask image, to obtain the second image, the first image being an image obtained by compressing the third image, the third image being an image with transparency, and the alpha value being used for indicating the transparency of the third image.

10. The apparatus according to claim 9, further comprising:
storing code configured to cause the at least one processor to store the alpha value of the third image in the red color component of the target mask image, before the first image is rendered by using the target mask image, in a case that the first image is the image obtained by compressing the third image, and the third image is the image with the transparency.

11. The apparatus according claim 9, wherein the rendering code comprises:
collecting code configured to cause the at least one processor to collect original data in the first image;
data obtaining code configured to cause the at least one processor to obtain first light variation data stored in the green color component of the target mask image, and second light variation data stored in the blue color component of the target mask image; and
first superimposing code configured to cause the at least one processor to superimpose the first light variation data and the second light variation data with the original data in the first image, to obtain the second image.

12. The apparatus according to claim 11, comprising:
third obtaining code configured to cause the at least one processor to obtain first light data after changing stored in the green color component of the target mask image, and second light data after changing stored in the blue color component of the target mask image, after the original data to be rendered in the first image is obtained; and
processing code, configured to cause the at least one processor to overwrite the data to be rendered in the first image with the first light data after changing and the second light data after changing, to obtain the second image.

13. The apparatus according to claim 8, wherein the rendering code comprises:
second superimposing code configured to cause the at least one processor to superimpose original data of the first image with the green color component and the blue color component of the target mask image corresponding to the first image by calling a target function, to obtain the second image.

14. A non-transitory computer-readable storage medium, storing a computer program that when executed by at least one processor causes the at least one processor to:
obtain a first image to control color changes of the first image;
obtain a target mask image corresponding to the first image where a green color component of the target mask image stores first light change data and a blue color component of the target mask image stores second light change data, the first light change data being change data of light on a left side of the first image used when the first image is rendered, and the second light change data being change data of light on a right side of the first image used when the first image is rendered; and
render the first image by using the target mask image to obtain a second image.

15. The non-transitory computer-readable storage medium according to claim 14, wherein the render the first image by using the target mask image, to obtain a second image comprises:
in a case that a red color component of the target mask image stores an alpha value of a third image, rendering the first image by using the red color component, the green color component, and the blue color component of the target mask image to obtain the second image, the first image being an image obtained by compressing the third image, the third image being an image with transparency, and the alpha value being used for indicating the transparency of the third image.

16. The non-transitory computer-readable storage medium according to claim 15, wherein before the rendering the first image by using the target mask image, the computer program is further configured to cause the at least one processor to:
store the alpha value of the third image in the red color component of the target mask image, in a case that the first image is the image obtained by compressing the third image, and the third image is the image with the transparency.

17. The non-transitory computer-readable storage medium according to claim 14, wherein the rendering the first image by using the target mask image, to obtain a second image comprises:
collecting original data in the first image;
obtaining first light variation data stored in the green color component of the target mask image, and second light variation data stored in the blue color component of the target mask image; and
superimposing the first light variation data and the second light variation data with the original data in the first image, to obtain the second image.

18. The non-transitory computer-readable storage medium according to claim 17, wherein the computer program is configured to cause the at least one processor to, after the original data to be rendered in the first image is obtained:
obtain first light data after changing stored in the green color component of the target mask image, and second light data after changing stored in the blue color component of the target mask image; and
overwrite the data to be rendered in the first image with the first light data after changing and the second light data after changing, to obtain the second image.

19. The non-transitory computer-readable storage medium according to claim 14, wherein the rendering the first image by using the target mask image, to obtain a second image comprises:
superimposing original data in the first image with the green color component and the blue color component of the target mask image corresponding to the first image by calling a target function, to obtain the second image.

20. The non-transitory computer-readable storage medium according to claim 14, wherein before the obtaining a first image to be rendered, the storage medium is further configured to cause the at least one processor to:
in a case that a change in data corresponding to the green color component and the blue color component of the target mask image corresponding to the third image is detected by using a judgment function, determine the third image as the first image to be rendered.

* * * * *